United States Patent [19]
Gebhardt et al.

[11] 3,994,370
[45] Nov. 30, 1976

[54] BRAKE DISC

[75] Inventors: Hans Gebhardt; Franz Prahl, both of Munich, Germany

[73] Assignee: Knorr-Bremse GmbH, Munich, Germany

[22] Filed: Mar. 12, 1976

[21] Appl. No.: 666,354

[30] Foreign Application Priority Data
Apr. 15, 1975 Germany.............................. 2516534

[52] U.S. Cl........................ 188/218 XL; 188/206 R
[51] Int. Cl.²........................................... F16D 65/12
[58] Field of Search............ 188/18 A, 73.1, 206 R, 188/218 XL; 192/107 R

[56] References Cited
UNITED STATES PATENTS
2,525,648  10/1950  Butler....................... 188/218 XL
3,926,285  12/1975  Preller et al................. 188/218 XL FOREIGN PATENTS OR APPLICATIONS
1,141,309  12/1962  Germany..................... 188/218 XL
1,151,060  5/1969  United Kingdom.......... 188/218 XL Primary Examiner—Duane A. Reger
Attorney, Agent, or Firm—Edmund M. Jaskiewicz

[57] ABSTRACT

A brake disc for disc brakes for vehicles comprises a brake disc annular element mounted on a hub. The annular element and hub are interconnected by a plurality of clamping sleeves seated in radially opposed bores in the hub and annular element. Each clamping sleeve comprises two sleeves disposed co-axially one within the other and each sleeve has an axially directed slot therein with the slots being offset 180°.

8 Claims, 4 Drawing Figures

BRAKE DISC

The present invention relates to a brake disc for disc brakes for rail and other vehicles, more particularly, to the clamping sleeves for connecting a brake disc annular element upon a hub.

Brake discs for disc brakes particularly for rail vehicles comprise a brake disc annular element which is mounted upon a hub element or a wheel element. The annular element is connected to the hub or wheel element by radial clamping sleeves for transmitting the braking forces from the brake disc annular element to the wheel or hub element. Such clamping sleeves have been generally provided with a straight or corrugated axially directed slot. The presence of the slot imparts a degree of resiliency to the clamping sleeve and thus permits to a limited extent offsetting of the radial bores in the hub and annular disc and also enables the clamping disc to absorb some of the shocks and impacts to which the connection is subjected.

One particular form of a clamping sleeve is provided with a corrugated slot wherein the gaps between the corrugations or teeth are somewhat offset so that upon assembly of the clamping sleeve in the opposed radial bores there will be a unilateral contact of the flanks or sides of the corrugations. Because of this wedged displacement of the corrugations or teeth there will occur a slight axial displacement of the clamping sleeve. At the same time, the clamping sleeve is fabricated with a somewhat larger diameter than the diameter of the bores in which the sleeve is to be inserted. As a result of the axial displacement of portions of the sleeve and radial compression of the sleeve such a clamping sleeve will be characterized by an optimum adaptation to the walls of the radial bores. However, this clamping sleeve has the disadvantage that extremely high stresses were set up in the dedendum or roots of the corrugations or teeth as a result of the wedging effect of the teeth. As a consequence, the clamping sleeves were ruptured.

It is therefore the principal object of the present invention to provide a brake disc for a vehicle disc brake having a novel and improved clamping sleeve for connecting the brake disc annular element to the hub.

It is another object of the present invention to provide such a clamping sleeve having both radial and axial resiliency but which is not susceptible to rupture.

According to one aspect of the present invention, a clamping sleeve for connecting a brake disc annular member radially to the hub of a brake disc may comprise at least two sleeves disposed coaxially one within the other such that the outer wall of the inner sleeve bears against the inner wall of the outer sleeve. Each sleeve has an axially directed slot therein and said slots are offset 180° with respect to each other.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
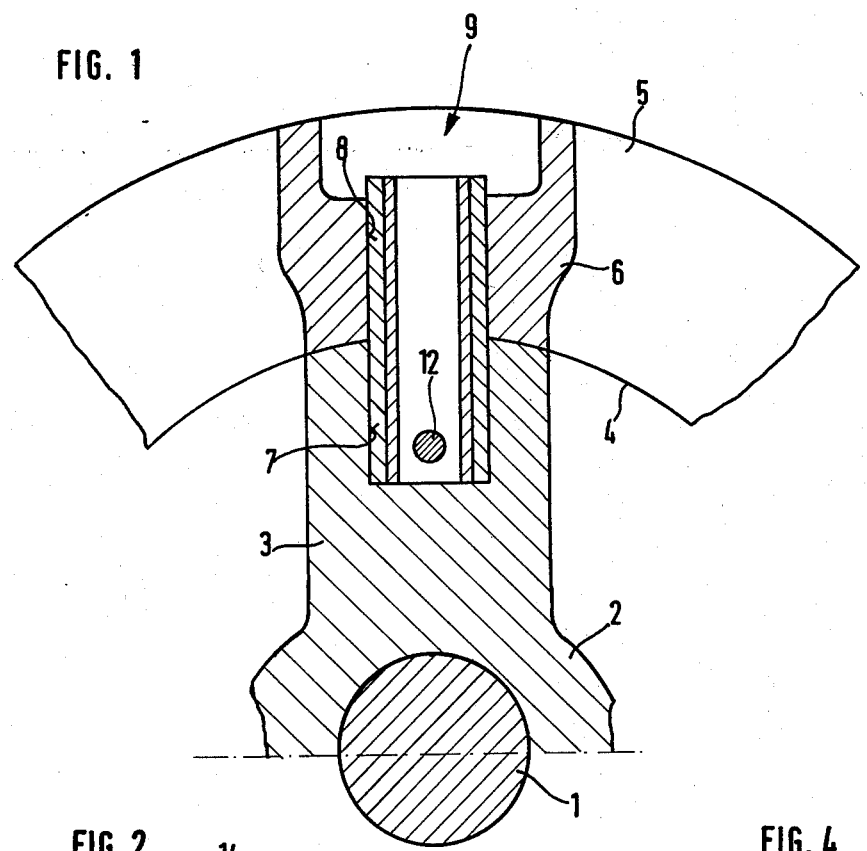
FIG. 1 is a portion of a radial sectional view through a brake disc incorporating the present invention.

In FIG. 1, there is illustrated a particular embodiment of the present invention which is intended for mounting upon an axle but it is to be understood that such a brake disc could also be mounted upon a wheel of a vehicle equipped with disc brakes. A hub or carrier member 2 is non-rotatably mounted upon an axle or shaft 1 and the hub has a plurality of radially extending one-piece arms 3. Fitted on the outer ends of the arms 3 is an inner peripheral surface 4 of a brake disc annular member 5 having lateral surfaces against which brake shoes are applied in opposite directions in a manner known in the art.

The annular member 5 comprises two axially spaced annular members which define the friction surfaces and these members are interconnected by webs 6 which are located in the vicinity of the arms 3. The web 6 and arms 3 are provided with opposed radial bores 8 and 7 which are aligned with each other in which are seated clamping sleeves 9 according to the present invention. These sleeves 9 are pre-stressed such that when they are inserted into the bores they securely but detachably connect the web 6 and arms 3. The clamping sleeve 9 is provided with a transverse bore 10 which is parallel to the axis of rotation of the axle 1 and pins or bolts 12 are inserted through the bores 10 to secure the sleeves 9 within the arms against axial displacement therein.

Figure 2:
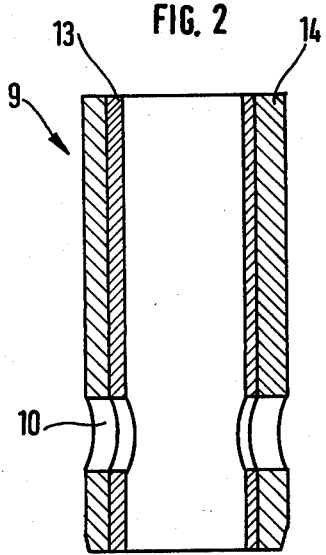
FIG. 2 is a longitudinal sectional view of the clamping sleeve according to the present invention and shown in FIG. 1.
Figure 3:
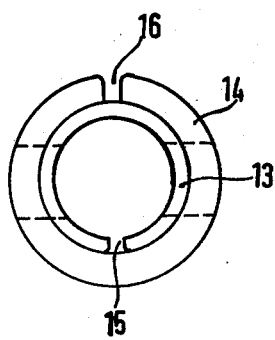
FIG. 3 is a transverse sectional view through the clamping sleeve of FIG. 2; and, FIG. 4 is an elevational view of a clamping sleeve according to the present invention illustrating the shape of the slot in the outer sleeve.

The clamping sleeve 9 according to the present invention is illustrated in FIG. 2 and comprises an inner sleeve 13 and an outer sleeve 14 which are disposed co-axially one within the other such that the outer peripheral surface of the inner sleeve 13 bears against the inner peripheral surface of the outer sleeve 14. The bore 10 passes through both sleeves 13 and 14 for receiving the securing pin 12. The sleeves 13 and 14 are of different wall thickness and may be formed of different materials. It is preferable that the sleeves are assembled jointly and that the inner sleeve is assembled under a predetermined larger tension within the outer sleeve than the tension initially imposed upon the outer sleeve.

Both the inner and outer sleeves 13 and 14 have a slots 15 and 16 respectively extending in the longitudinal direction thereof over the entire length of the sleeves. The sleeves are positioned with respect to each other so that the slots 15 and 16 are offset an angle of 180° with respect to each other. Since each clamping sleeve 9 has contact over virtually its entire outer peripheral surface with the surfaces of the bores 7 and 8, this clamping sleeve construction provides optimum connecting or supporting capacity between the hub 2 and the annular member 5. Thus, mechanical stresses to which the clamping sleeves may be subjected are distributed over the entire surface of the clamping sleeves and corrosion phenomena are avoided to a large extent in comparison with previously known clamping sleeves.

The offsetting relationship of the slots 15 and 16 significantly improves the supporting capacity of the clamping sleeves because the outer sleeve slot 16 provides support because of the presence of the inner sleeve 13.

It is a further feature of this invention that a component of any impact forces is absorbed by friction between the inner and outer sleeves while, at the same time, the resiliency of the double clamping sleeve 9 according to the present invention is substantially greater than in the case of the conventional clamping sleeve having the thickness of this double clamping sleeve. The wall thicknesses of the inner and outer sleeves 13 and 14 can be so selected that the clamping sleeve connection has optimum characteristics both from the resiliency viewpoint and from manufacturing operations and, as a result, such a clamping sleeve can be readily adapted to a wide range of operating conditions.

Both sleeves 13 and 14 can be made of spring steel but the springs can be made of different materials selected to obtain the optimum damping and/or resilient properties.

Figure 4:
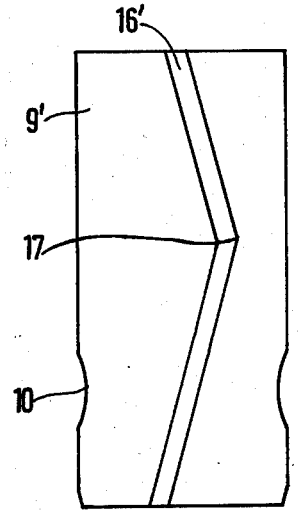

The slots 15 and 16 may also have varying shapes such as a straight longitudinal slot, a corrugated slot, a tooth slot or an arrow-shaped slot as shown in FIG. 4. The shapes of the slots 15 and 16 can also be varied in order to obtain desirable properties and characteristics of the double clamping sleeve 9.

A tooth shaped slot may be formed with only a single tooth so that the shape of the slot is similar to that of an arrow as shown in FIG. 4. As a result of such a single tooth shape of the slot any risk of rupture or fracture in the dedendum of the tooth is practically eliminated.

In FIG. 4 the clamping sleeve 9 is provided with a so-called herringbone or arrow slot 16'. The apex or tip 17 of the slot is preferably so located that it is disposed at the juncture between the annular member 5 and the hub 3. This arrow-shaped slot 16' is also advantageous in combination with the machining of the outer peripheral surface of the outer sleeve 14 such as is generally necessary for fitting the clamping sleeve into the bores 7 and 8. Machining of the outer peripheral surface of the inner sleeve 13 is generally unnecessary and thus the slot in the inner sleeve can be made to be continuously straight and parallel to the longitudinal axis of the sleeve.

It has been found to be advantageous to so dimension the inner sleeve 13 that in the unassembled state of the sleeve 9 the inner sleeve engages with a smaller force against the outer sleeve 14 than will be the case when the double clamping sleeve 9 is assembled or installed as shown in FIG. 1. The outer diameter of the inner sleeve 13 may also be so selected that only in the assembled state of the double clamping sleeve does the inner sleeve bear with a predetermined force against the outer sleeve.

It should also be borne in mind that the present invention is not limited to the specific embodiments disclosed herein nor to the shapes of the slots described above.

It will be understood that this invention is susceptible to modification in order to adapt it to different usages and conditions, and accordingly, it is desired to comprehend such modifications within this invention as may fall within the scope of appended claims.

What is claimed is:

1. A brake disc for disc brakes for vehicles comprising a hub, a brake disc annular element mounting on said hub, a plurality of clamping sleeves seated in radially opposed bores in said hub and annular element to transmit braking forces from said annular element to said hub, a said clamping sleeve comprising two sleeves disposed co-axially one within the other such that the outer wall of the inner sleeve bears against the inner wall of the outer sleeve, each said sleeve having an axially directed slot therein and said slots being offset 180°.

2. A brake disc as claimed in claim 1 wherein said slots each have a corrugated shape.

3. A brake disc as claimed in claim 1 wherein the slot in said outer sleeve has an angular shape and the slot in said inner sleeve is axial.

4. A brake disc as claimed in claim 3 wherein said angular slot has an apex located at the junction between said annular element and said hub.

5. A brake disc as claimed in claim 1 wherein said sleeves each have different wall thicknesses.

6. A brake disc as claimed in claim 1 wherein said sleeves are made from different materials.

7. A brake disc as claimed in claim 1 wherein said inner sleeve is pre-stressed and assembled in said outer sleeve under predetermined tension.

8. A clamping sleeve for connecting radially a brake disc annular member to a hub of a brake disc comprising two sleeves disposed coaxially one within the other such that the outer wall of the inner sleeve bears against the inner wall of the outer sleeve, each said sleeve having an axially directed slot therein and said slots being offset 180°.

* * * * *